United States Patent
Yamane

(10) Patent No.: US 11,110,532 B2
(45) Date of Patent: Sep. 7, 2021

(54) WIRE ELECTRICAL DISCHARGE MACHINE AND AUTO WIRE FEEDING METHOD

(71) Applicant: FANUC CORPORATION, Yamanashi (JP)

(72) Inventor: Hikaru Yamane, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

(21) Appl. No.: 15/804,518

(22) Filed: Nov. 6, 2017

(65) Prior Publication Data

US 2018/0126473 A1 May 10, 2018

(30) Foreign Application Priority Data

Nov. 8, 2016 (JP) .............................. JP2016-217863

(51) Int. Cl.
*B23H 7/10* (2006.01)

(52) U.S. Cl.
CPC .............. *B23H 7/10* (2013.01); *B23H 7/101* (2013.01); *B23H 7/102* (2013.01); *B23H 7/104* (2013.01)

(58) Field of Classification Search
CPC . B23H 7/08; B23H 7/10; B23H 7/101; B23H 7/102; B23H 7/104; B23H 7/105; B23H 7/26; B23H 7/30; B23H 7/34; B23H 7/36
USPC ...................................................... 219/69.12
See application file for complete search history.

(56) References Cited

U.S. PATENT DOCUMENTS

| | | | | | |
|---|---|---|---|---|---|
| 4,338,505 | A | * | 7/1982 | Katsube ................. | B23H 7/065 219/69.12 |
| 4,495,393 | A | * | 1/1985 | Janicke .................. | B23H 7/102 219/69.12 |
| 5,019,684 | A | * | 5/1991 | Ito .......................... | B23H 7/04 219/69.12 |

(Continued)

FOREIGN PATENT DOCUMENTS

| CN | 103874555 A | 6/2014 |
|---|---|---|
| CN | 105269099 A | 1/2016 |

(Continued)

OTHER PUBLICATIONS

Extended European Search Report dated Mar. 27, 2018 for related European Application No. 17001809.7, 5 pages.

(Continued)

*Primary Examiner* — Erin E McGrath
(74) *Attorney, Agent, or Firm* — Fredrikson & Byron, P.A.

(57) ABSTRACT

A wire electrical discharge machine having an auto wire feeding function includes: guide parts arranged on a wire feed path along which the wire electrode is fed so as to guide the feeding of the wire electrode; fluid paths formed with the guide parts to supply a compressed fluid to the wire feed path; a compressed fluid supply device to supply the compressed fluid to the fluid paths; a tension detector to detect the tension of the wire electrode; and a control device that controls the compressed fluid supply device so as to supply the compressed fluid to the fluid paths, and based on the detection result from the tension detector, determines whether or not the wire electrode has reached a supply position of one of the fluid paths on the wire feed path to which the fluid has been supplied.

16 Claims, 5 Drawing Sheets

(56) References Cited

U.S. PATENT DOCUMENTS

| | | | | |
|---|---|---|---|---|
| 5,036,174 A | * | 7/1991 | Iwasaki | B23H 7/10 |
| | | | | 219/69.12 |
| 5,044,662 A | | 9/1991 | Yamada | |
| 5,045,662 A | | 9/1991 | Yamada | |
| 5,162,630 A | * | 11/1992 | Iwasaki | B23H 7/102 |
| | | | | 219/69.12 |
| 6,698,639 B1 | | 3/2004 | Otomo et al. | |
| 2003/0010753 A1 | | 1/2003 | Yamada et al. | |
| 2016/0074950 A1 | * | 3/2016 | Sasaki | B23H 7/36 |
| | | | | 219/69.12 |

FOREIGN PATENT DOCUMENTS

| | | |
|---|---|---|
| CN | 106670602 A | 5/2017 |
| EP | 0664179 A1 | 7/1995 |
| EP | 1034872 A1 | 9/2000 |
| JP | 59205230 A | 11/1984 |
| JP | 62162425 A | 7/1987 |
| JP | 63180421 A | 7/1988 |
| JP | 63176028 U | 11/1988 |
| JP | 6416323 A | 1/1989 |
| JP | 1135426 A | 5/1989 |
| JP | 253529 A | 2/1990 |
| JP | 2160422 A | 6/1990 |
| JP | 2224926 A | 9/1990 |
| JP | 5212623 | 8/1993 |
| JP | 724644 A | 1/1995 |
| JP | 10180547 A | 7/1998 |
| JP | 3882751 B2 | 2/2007 |
| JP | 20188336 A | 1/2018 |

OTHER PUBLICATIONS

English Abstract and Machine Translation for Chinese Publication No. 103874555 A, published Jun. 18, 2014, 17 pgs.

English Abstract and Machine Translation for Chinese Publication No. 105269099 A, published Jan. 27, 2016, 22 pgs.

English Abstract for Japanese Publication No. 3882751 B2, published Feb. 21, 2007, 2 pgs.

English Abstract for Japanese Publication No. JPH02224926 A, published Sep. 6, 1990, 1 pg.

English Abstract and Machine Translation for Japanese Publication No. 02-160422 A, published Jun. 20, 1990, 8 pgs.

English Abstract for Japanese Publication No. JPH0724644 A, published Jan. 27, 1995, 1 pg.

English Abstract and Machine Translation for Japanese Publication No. 2018008336 A, published Jan. 18, 2018, 16 pgs.

English Abstract and Machine Translation for Japanese Publication No. 10-180547 A, published Jul. 7, 1998, 12 pgs.

English Abstract and Machine Translation for Japanese Publication No. 05-212623 A, published Aug. 24, 1993, 10 pgs.

English Abstract and Machine Translation for Japanese Publication No. 02-053529 A, published Feb. 22, 1990, 7 pgs.

English Abstract and Machine Translation for Japanese Publication No. 01-135426 A, published May 29, 1989, 9 pgs.

English Abstract and Machine Translation for Japanese Publication No. 63-180421 A, published Jul. 25, 1988, 5 pgs.

English Abstract and Machine Translation for Japanese Publication No. 62-162425 A, published Jul. 18, 1987, 10 pgs.

English Abstract and Machine Translation for Japanese Publication No. 59-205230 A, published Nov. 20, 1984, 11 pgs.

English Abstract and Machine Translation for Japanese Publication No. 64-016323 A, published Jan. 19, 1989, 8 pgs.

English Abstract and Machine Translation for Chinese Publication No. 106670602 A, published May 17, 2017, 15 pgs.

English Abstract and Machine Translation for Japanese Publication No. 63-176028 U, published Nov. 15, 1988, 5 pgs.

* cited by examiner

WIRE ELECTRICAL DISCHARGE MACHINE AND AUTO WIRE FEEDING METHOD

CROSS-REFERENCE TO RELATED APPLICATION

This application is based upon and claims the benefit of priority from Japanese Patent Application No. 2016-217863 filed on Nov. 8, 2016, the contents of which are incorporated herein by reference.

BACKGROUND OF THE INVENTION

Field of the Invention

The present invention relates to a wire electrical discharge machine having an auto wire feeding function as well as to an auto wire feeding method.

Description of the Related Art

A typical wire electrical discharge machine has an auto wire feeding function for performing wire feeding by automatically passing the wire electrode through a machining start hole formed in a workpiece or a machining slot formed in a workpiece by electrical discharge machining. However, if the tip of the wire electrode is caught on an object during auto wire feeding, auto feeding of the wire electrode fails.

Therefore, conventionally, as disclosed in Japanese Laid-Open Patent Publication Nos. 02-160422 and 02-224926, the wire electrical discharge machine is configured to detect flexure of the wire electrode in order to detect the wire electrode getting stuck. The reason for detecting flexure of the wire electrode is that when the wire electrode gets stuck on an object, the wire electrode is flexed, so that catching of the wire electrode (failure of auto wire feeding) can be known by detecting the flexure.

SUMMARY OF THE INVENTION

However, since the above Japanese Laid-Open Patent Publications Nos. 02-160422 and 02-224926 only detect failures of auto wire feeding by detecting flexure of the wire electrode, it is impossible to detect how far the wire electrode has proceeded on a wire feed path of the wire electrode. For this reason, in the Japanese Laid-Open Patent Publication Nos. 02-160422 and 02-224926, if the tip of the wire electrode is not stuck on an object and the wire electrode strays away from the original path, it is impossible to detect the failure of auto wire feeding.

It is therefore an object of the present invention to provide a wire electrical discharge machine and an auto wire feeding method that enable detection of the position to which a wire electrode has been fed on the wire feed path.

According to a first aspect of the present invention, a wire electrical discharge machine having an auto wire feeding function for automatically feeding a wire electrode, includes: a supply roller configured to supply the wire electrode; a collection roller configured to collect the wire electrode supplied from the supply roller; a guide part, provided on a wire feed path along which the wire electrode is conveyed from the supply roller to the collection roller, and configured to guide the feeding of the wire electrode; a fluid path formed with the guide part to supply a compressed fluid to the wire feed path so as to feed the wire electrode along the wire feed path; a compressed fluid supply device configured to supply the compressed fluid to the fluid path; a tension detector configured to detect the tension of the wire electrode; and a control device configured to control the compressed fluid supply device so as to supply the compressed fluid to the fluid path and determine whether or not the wire electrode has reached a supply position on the wire feed path to which the compressed fluid has been supplied from the fluid path, based on the detection result from the tension detector.

With this configuration, it is possible to determine whether or not the wire electrode has reached the supply position. Accordingly, it is possible to detect up to which position on the wire feed path the wire electrode has been conveyed, and it is possible to detect the feed state of the wire electrode.

The wire electrical discharge machine of the first aspect of the present invention may be constructed such that under the condition where the compressed fluid is supplied to the fluid path by controlling the compressed fluid supply device, when the tension of the wire electrode detected by the tension detector changes or is equal to or greater than a threshold, the control device determines that the wire electrode has reached the supply position on the wire feed path to which the compressed fluid has been supplied through the fluid path.

This configuration makes it possible to accurately detect which position on the wire feed path the wire electrode 12 has reached with a simple structure.

In the electrical discharge machine of the first aspect of the present invention, a plurality of fluid paths may be formed with the guide parts so as to communicate with the wire feed path at different positions along the wire feed path. Also, multiple guide parts formed with the fluid path may be provided.

With this feature, it is possible to determine, at each of the multiple positions (supply positions) on the feed path of the wire electrode, whether or not the wire electrode has been fed up to the positions. Therefore, it is possible to more finely detect to which position on the wire feed path the wire electrode has been conveyed, and it is possible to accurately detect the feed state of the wire electrode.

The electrical discharge machine of the first aspect of the present invention may be configured such that the control device controls the compressed fluid supply device so as to supply the compressed fluid from the fluid paths, sequentially in the order from the upstream side with respect to the direction of feeding of the wire electrode, and, when determining that the wire electrode has reached the supply position on the wire feed path to which the compressed fluid has been supplied through the fluid path, the control device controls the compressed fluid supply device so as to supply the compressed fluid to the next fluid path located on the downstream side.

As a result, the compressed fluid is supplied from the fluid paths sequentially from the upstream side along the feed direction of the wire electrode, so that it is possible to detect which position on the wire feed path the wire electrode has reached and it is possible to detect the feed state of the wire electrode in a favorable manner.

In the electrical discharge machine of the first aspect of the present invention, the wire electrical discharge machine may further includes a delivery amount detector for detecting a delivery amount of the wire electrode, and may be constructed such that when estimating the tip position of the wire electrode on the wire feed path based on the delivery amount detected by the delivery amount detector and determining that the tip of the wire electrode is expected to have reached the supply position of the fluid path on the wire feed path, the control device controls the compressed fluid supply device so as to supply the compressed fluid to the fluid path corresponding to the supply point on the feed path which the tip of the wire electrode is determined to have reached, and that based on the detection result from the tension detector, the control device determines whether or not the wire electrode has reached the supply position.

This configuration eliminates the need to wastefully supply the compressed fluid and enables determination on whether or not the wire electrode has been fed to its expected tip position. Therefore, it is possible to accurately detect which position on the wire feed path the wire electrode has reached, and it is also possible to accurately detect the feed state of the wire electrode.

The electrical discharge machine of the first aspect of the present invention may be constructed such that when the control device determines based on the detection result from the tension detector that the tip of the wire electrode has not yet reached the expected supply position on the wire feed path even after a lapse of a certain time from the start of supplying the compressed fluid, the control device determines that an anomaly has occurred in the feeding of the wire electrode.

This makes it possible to determine whether or not the wire electrode is being conveyed out of the regular wire feed path as well as to detect the feed state of the wire electrode.

The electrical discharge machine of the first aspect of the present invention may be constructed such that the control device controls the compressed fluid supply device so as to vary the flow rate or pressure of the compressed fluid supplied to the fluid path in a predetermined pattern, and when the tension of the wire electrode detected by the tension detector changes in the predetermined pattern, the control device determines that the wire electrode has reached the supply position along the wire feed path to which the compressed fluid has been supplied through the fluid path.

Thus, this configuration makes it possible to prevent erroneous determination of the feed state of the wire electrode due to noise included in the detection signal of the tension detector. Therefore, the position on the wire feed path to which the wire electrode has been conveyed can be accurately detected, it is hence possible to accurately detect the feed state of the wire electrode.

In the wire electrical discharge machine of the first aspect of the present invention, the control device may display the feed state of the wire electrode on a display unit. This enables the operator to recognize the feed state of the wire electrode.

A second aspect of the present invention resides in an auto wire feeding method for use in a wire electrical discharge machine having an auto wire feeding function for automatically feeding a wire electrode, wherein the wire electrical discharge machine comprises: a supply roller configured to supply the wire electrode; a collection roller configured to collect the wire electrode supplied from the supply roller; a guide part, provided on a wire feed path along which the wire electrode is conveyed from the supply roller to the collection roller, and configured to guide the feeding of the wire electrode; and a fluid path formed with the guide part to supply a compressed fluid to the wire feed path so as to feed the wire electrode along the wire feed path, and the method comprises: a supply step of supplying the compressed fluid to the fluid path; a tension detection step of detecting the tension of the wire electrode; and a determination step of determining whether or not the wire electrode has reached a supply position on the wire feed path to which the compressed fluid is supplied from the fluid path, based on the detected tension of the wire electrode.

With this configuration, it is possible to determine whether or not the wire electrode has reached the supply position. Accordingly, it is possible to detect to which position on the wire feed path the wire electrode has been conveyed, and it is possible to detect the feed state of the wire electrode.

The auto wire feeding method of the second aspect of the present invention may be configured such that under the condition where the compressed fluid is supplied to the fluid path, when the tension of the wire electrode detected by the tension detector changes or is equal to or greater than a threshold, the determination step determines that the wire electrode has reached the supply position on the wire feed path to which the compressed fluid has been supplied through the fluid path.

This configuration makes it possible to accurately detect which position on the wire feed path the wire electrode 12 has reached with a simple structure.

In the auto wire feeding method of the second aspect of the present invention may be configured such that a plurality of fluid paths are formed with one or more of the guide parts so as to communicate with the wire feed path at different positions along the wire feed path, and the supply step supplies the compressed fluid from the fluid paths, sequentially in the order from the upstream side with respect to the direction of feeding of the wire electrode, and, when determining that the wire electrode has reached the supply position on the wire feed path to which the compressed fluid has been supplied through the fluid path, supplies the compressed fluid to the next fluid path located on the downstream side.

With this, it is possible to determine whether or not the wire electrode has been fed at each of the multiple positions (supply positions) on the feed path of the wire electrode. Therefore, it is possible to more finely detect to which position on the wire feed path the wire electrode has been conveyed, and it is possible to accurately detect the feed state of the wire electrode. Further, since the compressed fluid is supplied from the fluid paths sequentially from the upstream side along the feed direction of the wire electrode, it is possible to detect which position on the wire feed path the wire electrode has reached and it is possible to detect the feed state of the wire electrode in a favorable manner.

The auto wire feeding method of the second aspect of the present invention may further include: a delivery amount detection step of detecting a delivery amount of the wire electrode; a position estimation step of estimating the tip position of the wire electrode on the wire feed path, based on the detected delivery amount; and a determination step of determining whether or not the tip of the wire electrode has reached the supply position of the fluid path on the wire feed path, and may be configured such that the supply step, when the tip of the wire electrode is determined to have reached the supply position of the fluid path on the wire feed path, supplies the compressed fluid to the fluid path corresponding to the supply point on the feed path which the tip of the wire electrode is determined to have reached, and the determination step, based on the detected tension of the wire electrode, determines whether or not the wire electrode has reached the supply position.

These features prevent a wasteful supply of the compressed fluid and enables determination on whether or not the wire electrode has been fed to its expected tip position. Therefore, it is possible to accurately detect which position on the wire feed path the wire electrode has reached, and it is also possible to accurately detect the feed state of the wire electrode.

The auto wire feeding method of the second aspect of the present invention may be configured such that when it is determined based on the detected tension of the wire electrode that the tip of the wire electrode has not yet reached the expected supply position on the wire feed path even after a lapse of a certain time from the start of supplying the compressed fluid, the determination step determines that an anomaly has occurred in the feeding of the wire electrode.

These features make it possible to determine whether or not the wire electrode is being conveyed out of the regular wire feed path as well as to detect the feed state of the wire electrode.

The auto wire feeding method of the second aspect of the present invention may be configured such that the supply step supplies the compressed fluid to the fluid path as varying the flow rate or pressure of the compressed fluid in a predetermined pattern, and when the detected tension of the wire electrode changes in the predetermined pattern, the determination step determines that the wire electrode has reached the supply position along the wire feed path to which the compressed fluid has been supplied through the fluid path.

Thus, this configuration makes it possible to prevent erroneous determination of the feed state of the wire electrode due to noise included in the detection signal of the tension detector. Therefore, the position on the wire feed path to which the wire electrode has been conveyed can be accurately detected, it is hence possible to accurately detect the feed state of the wire electrode.

According to the present invention, it is possible to detect to which position on the wire feed path the wire electrode has been fed, and it is also possible to detect the feed state of the wire electrode.

The above description of the following description when taken in conjunction with the accompanying drawings in which a preferred embodiment of the present invention is shown by way of illustrative example.

DESCRIPTION OF THE PREFERRED EMBODIMENTS

The wire electrical discharge machine and auto wire feeding method according to the present invention will be described in detail hereinbelow by explaining preferred embodiments with reference to the accompanying drawings.

Figure 1:
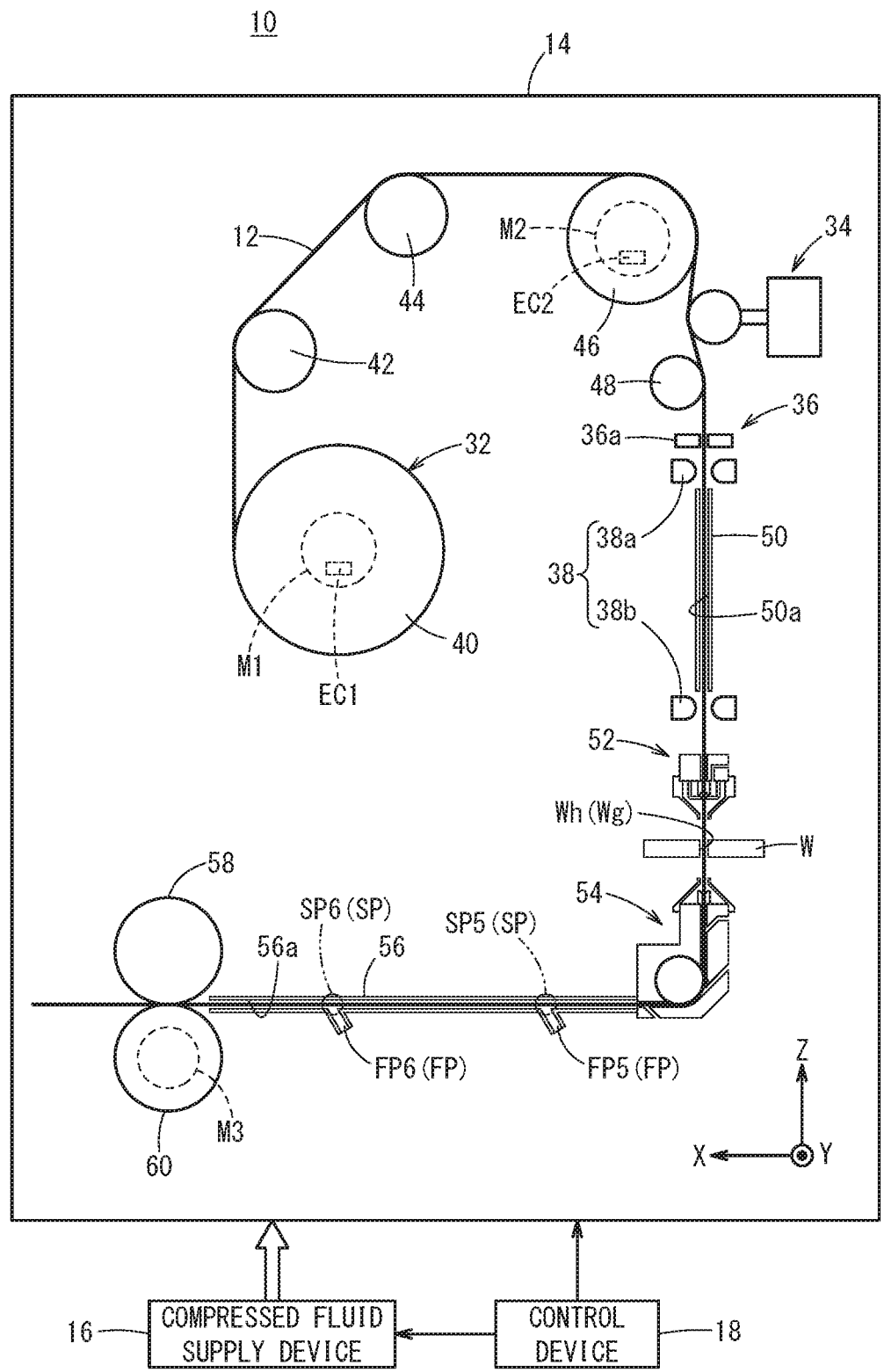
FIG. 1 is a diagram schematically showing the overall configuration of a wire electrical discharge machine according to an embodiment.

FIG. 1 is a diagram schematically showing the overall configuration of a wire electrical discharge machine 10 according to the embodiment. The wire electrical discharge machine 10 is a machine tool that effects machining (electrical discharge machining) on an object or workpiece W to be machined, by applying a voltage across an electrode gap (clearance) formed between a wire electrode 12 and the workpiece W to generate sparks. The wire electrical discharge machine 10 has an auto wire feeding function, and at least includes a main machine body 14, a compressed fluid supply device 16, and a control device 18. The main machine body 14 of the present embodiment processes the workpiece W in a working fluid.

The wire electrode 12 is formed of, for example, metal material such as tungsten-based, copper-alloy based, and brass-based material. On the other hand, the material of the workpiece W is, for example, metal material such as iron-based material and superhard material (tungsten carbide).

The main machine body 14 includes a wire feeding mechanism 32 that feeds the wire electrode 12 toward the object or workpiece W to be machined, passes the wire electrode 12 through the machining start hole Wh or the machining groove Wg of the workpiece W, and further feeds the wire into an unillustrated collecting box. The main machine body 14 further includes a tension detector 34 for detecting the tension of the wire electrode 12, a flexure detector 36 for detecting the flexure of the wire electrode 12, and a cutting electrode assembly 38 for cutting the wire electrode 12. The machining start hole Wh is a hole for inserting the wire electrode 12 through the workpiece W before start of the machining of the workpiece W, and the machining groove Wg is a kerf formed by machining. It should be noted that the workpiece W is supported by a table (not shown) movable along a plane (XY-plane).

The wire feeding mechanism 32 includes, in the order from the upstream side to the downstream side, a wire bobbin 40, guide rollers 42, 44, a brake roller 46, a guide roller 48, an upper pipe 50, an upper wire guide 52, a lower wire guide 54, a lower pipe 56, a pinch roller 58, and a feed roller 60. The wire feeding mechanism 32 defines the wire feed path of the wire electrode 12. The workpiece W is located between the upper wire guide 52 and the lower wire guide 54.

Note that the auto wire feeding of the wire electrode 12 means that the wire electrode 12 wound on the wire bobbin 40 is fed along the wire feed path defined by the wire feeding mechanism 32 through the upper wire guide 52, the workpiece W, the lower wire guide 54, etc., to be gripped between the pinch roller 58 and the feed roller 60. When the wire electrode 12 is fed, a predetermined tension is applied to the wire electrode 12.

The tension detector 34 is a sensor arranged between the brake roller 46 and the guide roller 48 to detect the tension of the wire electrode 12. The flexure detector 36 is a sensor provided between the guide roller 48 and the upper pipe 50 to detect the flexure of the wire electrode 12. The flexure detector 36 has an annular electrode 36a, and the wire electrode 12 is inserted through the annular electrode 36a. When the wire electrode 12 touches the annular electrode 36a, the flexure detector 36 outputs a contact signal (flexure signal) as a detection signal to the control device 18.

The cutting electrode assembly 38 includes an upper electrode 38a and a lower electrode 38b. The upper electrode 38a is arranged between the guide roller 48 and the upper pipe 50, specifically, between the flexure detector 36 and the upper pipe 50. The lower electrode 38b is arranged between the upper pipe 50 and the upper wire guide 52. The upper electrode 38a and the lower electrode 38b each function as a gripper that holds the wire electrode 12 in case of the breakage of the wire electrode 12, and is opened and closed by an unillustrated actuator under the control of the control device 18.

A long wire electrode 12 is wound on the wire bobbin (supply roller) 40. The wire electrode 12 supplied from the wire bobbin 40 is wound around the guide rollers 42, 44, brake roller 46 and guide roller 48, then sent to the upper pipe 50. The wire electrode 12 sent to the upper pipe 50 advances downward (in the negative Z-direction) through a passage hole 50a of the upper pipe 50 and reaches the upper wire guide (guide part) 52. Then, the wire electrode 12 reaching the upper wire guide 52 passes through the machining start hole Wh or the machining groove Wg of the workpiece W located between the upper wire guide 52 and the lower wire guide 54 and advances downward (in the negative Z-direction) toward the lower wire guide (guide part) 54. The wire electrode 12 sent to the lower wire guide 54, passing through a passage hole 56a of the lower pipe (guide part) 56, is collected by the pinch roller 58 and the feed roller 60 (collection roller) that hold the wire electrode 12 together.

The wire bobbin 40 is rotated by a torque applied from a motor (rotary drive source) M1. The motor M1 has an encoder EC1 and is driven under the control of the control device 18. The guide rollers 42, 44 deflect the direction of travel of the wire electrode 12 delivered from the wire bobbin 40 and guide the wire toward the brake roller 46. The brake roller 46 applies a braking force by friction to the wire electrode 12. The brake roller 46 is rotated by a torque applied from a motor (rotary drive source) M2. The motor M2 has an encoder EC2 and is driven under the control of the control device 18. By changing the torque applied to the brake roller 46, the braking force can be applied to the wire electrode 12. The feed roller 60 is also rotated by a torque given from a motor (rotary drive source) M3 driven under the control of the control device 18.

The guide roller 48 guides the wire electrode 12 having passed through the tension detector 34 to the passage hole 50a of the upper pipe 50. The upper pipe 50 cooperates with the cutting electrode assembly 38 (the upper electrode 38a and the lower electrode 38b) and the brake roller 46 to cut the wire electrode 12. Cutting of the wire electrode 12 will be described in detail later.

Figure 2:
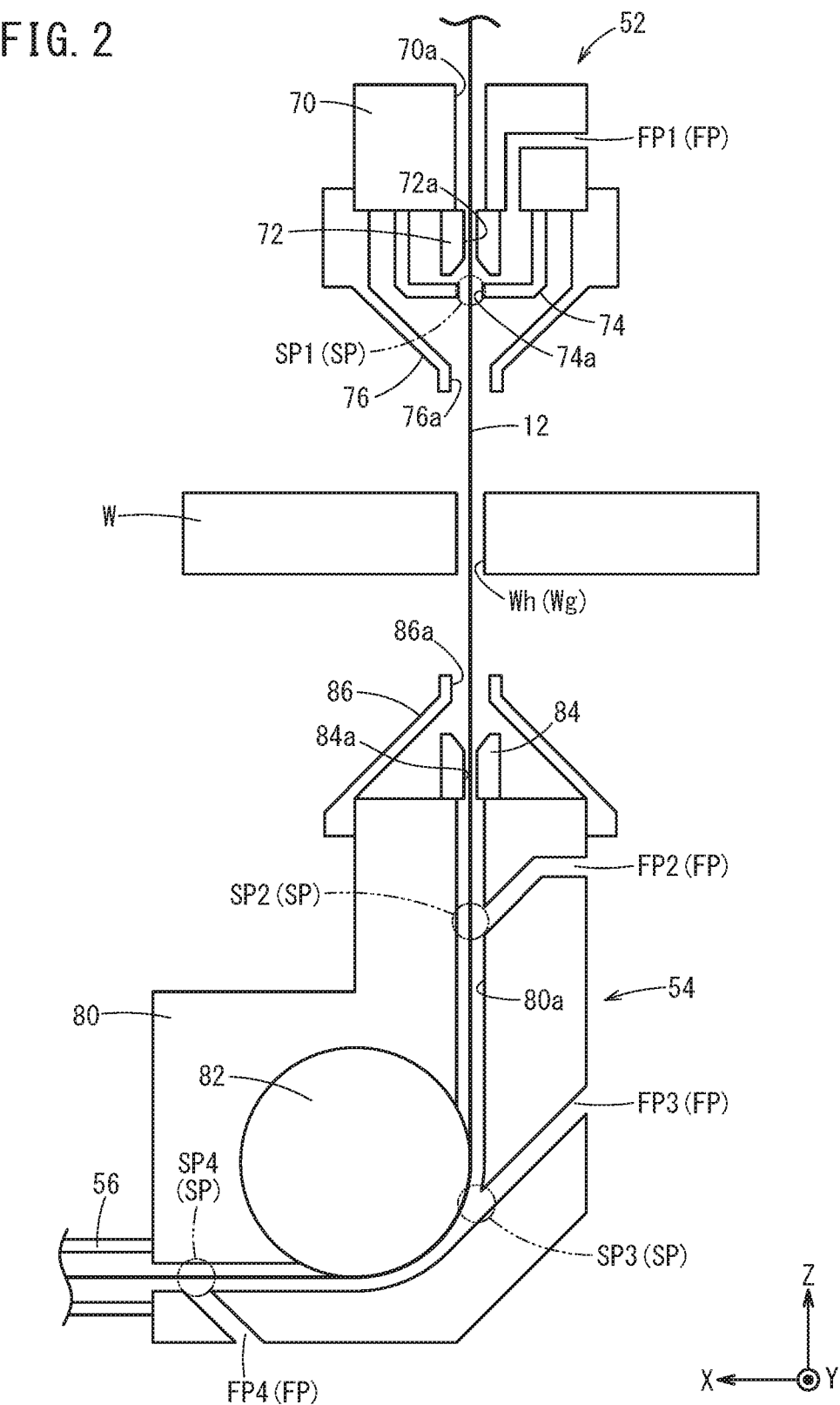
FIG. 2 is an enlarged view of an upper wire guide and a lower wire guide shown in FIG. 1.

As shown in FIG. 2, the upper wire guide 52 includes an upper guide block 70, an upper die guide 72, a jet nozzle 74, and an upper nozzle 76. Formed inside the upper guide block 70 is a passage hole 70a which extends in the vertical direction (Z-direction orthogonal to the XY-plane) and through which the wire electrode 12 passes. The upper guide block 70 guides the wire electrode 12 heading toward the workpiece W.

The upper die guide 72 is attached to the lower part of the upper guide block 70 and positions the wire electrode 12 that is sent to the workpiece W at a position above the workpiece W (in the positive Z-direction). Formed inside the upper die guide 72 is a passage hole 72a communicating with the passage hole 70a of the upper guide block 70 and extending in the vertical direction so as for the wire electrode 12 to pass therethrough. The passage hole 72a of the upper die guide 72 is smaller in diameter than the passage hole 70a of the upper guide block 70 and slightly greater in outer diameter than the wire electrode 12.

The jet nozzle 74 is attached to the lower part of the upper guide block 70 so as to cover the upper die guide 72 from below (the negative Z-direction). The jet nozzle 74 has a nozzle hole 74a that is formed under the passage hole 72a of the upper die guide 72 and allows the wire electrode 12 to pass through. Thus, the wire electrode 12 having passed through the passage hole 72a of the upper die guide 72 is sent downward through the nozzle hole 74a of the jet nozzle 74. The nozzle hole 74a has a diameter slightly greater than the outer diameter of the wire electrode 12. At the time of auto wire feeding, the jet nozzle 74 ejects, from the nozzle hole 74a, a compressed fluid (liquid such as compressed water etc. or gas such as compressed air etc.) supplied from the compressed fluid supply device 16 through a fluid path FP (hereinafter referred to as FP1) formed in the upper guide block 70. This fluid path FP1 is to supply the compressed fluid to the wire feed path in order to guide the wire electrode 12 along the wire feed path. The compressed fluid supplied from the fluid path FP1 is spouted downward from the nozzle hole 74a by the jet nozzle 74, whereby the compressed fluid is spouted along the wire feed path. The supply position (also referred to as a supply region) SP of the compressed fluid on the wire feed path by the fluid path FP1 is referred to as SP1.

The upper nozzle 76 is attached to the lower part of the upper guide block 70 so as to cover the upper die guide 72 and the jet nozzle 74 from below (the negative Z-direction). The upper nozzle 76 is formed to be tapered downward. A nozzle hole 76a is formed at the tip (lower end) of the upper nozzle 76. The nozzle hole 76a is located below the passage hole 72a of the upper die guide 72 and the nozzle hole 74a of the jet nozzle 74. In this arrangement, the wire electrode 12 passing through the passage hole 72a of the upper die guide 72 and the nozzle hole 74a of the jet nozzle 74 is sent downward (toward the workpiece W) through the nozzle hole 76a of the upper nozzle 76. The nozzle hole 76a of the upper nozzle 76 has a diameter greater than the diameter of the nozzle hole 74a of the jet nozzle 74. The upper nozzle 76 ejects from the nozzle hole 76a the working fluid supplied from an unillustrated working fluid supply device downward to supply the working fluid to the lower workpiece W located below. During the machining, the upper wire guide 52, the workpiece W, and the lower wire guide 54 are submerged in the working fluid stored in a machining tank (not shown), but during auto wire feeding, it is preferable that no working fluid is stored in the work tank.

The lower wire guide 54 includes a lower guide block 80, a lower guide roller 82, a lower die guide 84, and a lower nozzle 86. The lower guide block 80 is formed in a substantially L-shape extending in the vertical direction (Z-direction) and the horizontal direction (X-direction). Formed inside the lower guide block 80 is a passage hole 80a for guiding the wire electrode 12 having passed through the machining start hole Wh or machining groove Wg of the workpiece W. The passage hole 80a has a substantially L-shaped profile so as to deflect the direction of travel of the wire electrode 12 being guided downward (in the negative Z-direction) to the horizontal direction (positive X-direction).

The lower guide block 80 is formed with one or multiple fluid paths FP communicating with the passage hole 80a. This fluid path FP supplies the compressed fluid supplied from the compressed fluid supply device 16 to the passage hole 80a which is the wire feed path of the wire electrode 12. When multiple fluid paths FP are formed in the lower guide block 80, the multiple fluid paths FP are formed in the lower guide block 80 so as to communicate with the passage hole 80a (the wire feed path) at different positions from each other along the wire feed path (the passage hole 80a) of the wire electrode 12. That is, the multiple fluid paths FP formed in the lower guide block 80 can supply the compressed fluid from the different positions along the wire feed path to the passage hole 80a which is the wire feed path.

Here, among the multiple fluid paths FP formed in the lower guide block 80, the fluid path FP that communicates with the passage hole 80*a* at the most upstream side is referred to as a fluid path FP2, the fluid path FP that communicates with the passage hole 80*a* next to FP2 on the downstream side of FP2 is referred to as a fluid path FP3, and the fluid path FP that communicates with the passage hole 80*a* at the most downstream side is referred to as a fluid path FP4. Specifically, the fluid path FP2 communicates with the passage hole 80*a* at a point located on the upstream side of the lower guide roller 82, the fluid path FP3 communicates with the passage hole 80*a* at a point where the lower guide roller 82 is located, and the fluid path FP4 communicates with the passage hole 80*a* at a point located on the downstream side of the lower guide roller 82. Note that a supply position SP of the compressed fluid from the fluid path FP2 on the wire feed path is referred to as SP2, a supply position SP of the compressed fluid from the fluid path FP3 on the wire feed path is referred to as SP3, a supply position SP of the compressed fluid from the fluid path FP4 on the wire feed path is referred to as SP4.

The lower guide roller 82 is arranged inside the lower guide block 80 so that part of the lower guide roller 82 protrudes into the passage hole 80*a* around the bent portion (curved portion) of the passage hole 80*a* of a substantially L-shaped profile. The lower guide roller 82 reduces the friction against the wire electrode 12 around the bent portion of the substantially L-shaped passage hole 80*a* for a smooth conveyance of the wire electrode 12.

The lower die guide 84 is attached to the upper portion of the lower guide block 80 and positions the wire electrode 12 sent from the workpiece W under the workpiece W (on the negative Z-direction side). Thus, the wire electrode 12 passing through the machining start hole Wh or machining groove Wg of the workpiece W is positioned by the upper die guide 72 and the lower die guide 84. Formed inside the lower die guide 84 is a passage hole 84*a* communicating with the passage hole 80*a* of the lower guide block 80 and extending in the vertical direction for the wire electrode 12 to pass therethrough. The passage hole 84*a* of the lower die guide 84 has a diameter smaller than the passage hole 80*a* of the lower guide block 80 and slightly greater than the outer diameter of the wire electrode 12.

The lower nozzle 86 is attached to the upper portion of the lower guide block 80 so as to cover the lower die guide 84 from above (the positive Z-direction). The lower nozzle 86 is formed to taper upward. A nozzle hole 86*a* is formed at the tip (upper end) of the lower nozzle 86. The nozzle hole 86*a* is located above the passage hole 84*a* of the lower die guide 84. In this arrangement, the wire electrode 12 having passed through the machining start hole Wh or the machining groove Wg of the workpiece W is sent through the nozzle hole 86*a* to the passage hole 84*a* of the lower die guide 84 located therebelow. The nozzle hole 86*a* of the lower nozzle 86 and the nozzle hole 76*a* of the upper nozzle 76 may have substantially the same diameter. The lower nozzle 86 spouts the working fluid supplied from the working fluid supply device (not shown) upward from the nozzle hole 86*a* to supply the working fluid to the workpiece W located above.

Returning to the explanation of FIG. 1, the lower pipe 56 arranged on the positive X-direction side of the lower wire guide 54 has one or multiple fluid paths FP communicating with the passage hole 56*a* through which the wire electrode 12 is inserted. The fluid path FP supplies the compressed fluid supplied from the compressed fluid supply device 16 to the passage hole 56*a* which is the wire feed path of the wire electrode 12. When multiple fluid paths FP are formed in the lower pipe 56, the multiple fluid paths FP are formed in the lower pipe 56 so as to communicate with the passage hole 56*a* (the wire feed path) at different positions from each other along the wire feed path (the passage hole 56*a*) of the wire electrode 12. That is, the multiple fluid paths FP formed in the lower pipe 56 can supply the compressed fluid from the different positions along the wire feed path to the passage hole 56*a* which the wire feed path.

Here, among the plurality of fluid paths FP formed in the lower pipe 56, the fluid path FP that communicates with the passage hole 56*a* at the most upstream side is referred to as a fluid path FP5, and the fluid path FP that communicates with the passage hole 56*a* next to the fluid path FP and on the downstream side of the fluid path FP is referred to as a fluid path FP6. Further, a supply position SP of the compressed fluid from the fluid path FP5 on the wire feed path is referred to as SP5 and the supply position SP of the compressed fluid from the fluid path FP6 on the wire feed path is referred to as SP6.

The compressed fluid supply device 16 can selectively supply the compressed fluid to any one of the multiple fluid paths FP (FP1 to FP6). That is, the compressed fluid supply device 16 can switch fluid paths FP for supplying the compressed fluid from one to another. This switching is performed under the control of the control device 18. For example, the compressed fluid supply device 16 may include a pump for drawing up the compressed fluid from a storage tank for the compressed fluid and multiple switching valves, and the control device 18 may control the multiple switching valves so that the compressed fluid can be supplied to one of the fluid paths FP.

The control device 18 controls individual components of the main machine body 14 and the compressed fluid supply device 16. When the wire electrode 12 breaks, when the machining point is changed, when the workpiece W is replaced, or when the auto wire feeding fails, the control device 18 cuts the wire electrode 12 and controls the individual components of the main machine body 14 and the compressed fluid supply device 16 so as to perform automatic feeding of the wire electrode 12. A downstream-side cut wire electrode 12 is collected into the collecting box by the pinch roller 58 and the feed roller 60. Then, the control device 18 feeds an upstream-side severed wire electrode 12 along the wire feed path to start auto wire feeding. The fed wire electrode 12 passes through the upper wire guide 52, the machining start hole Wh or machining groove Wg of the workpiece W, the lower wire guide 54, and the lower pipe 56 and is pinched between the pinch roller 58 and the feed roller 60, which completes auto wire feeding of the wire electrode 12.

Figure 3:
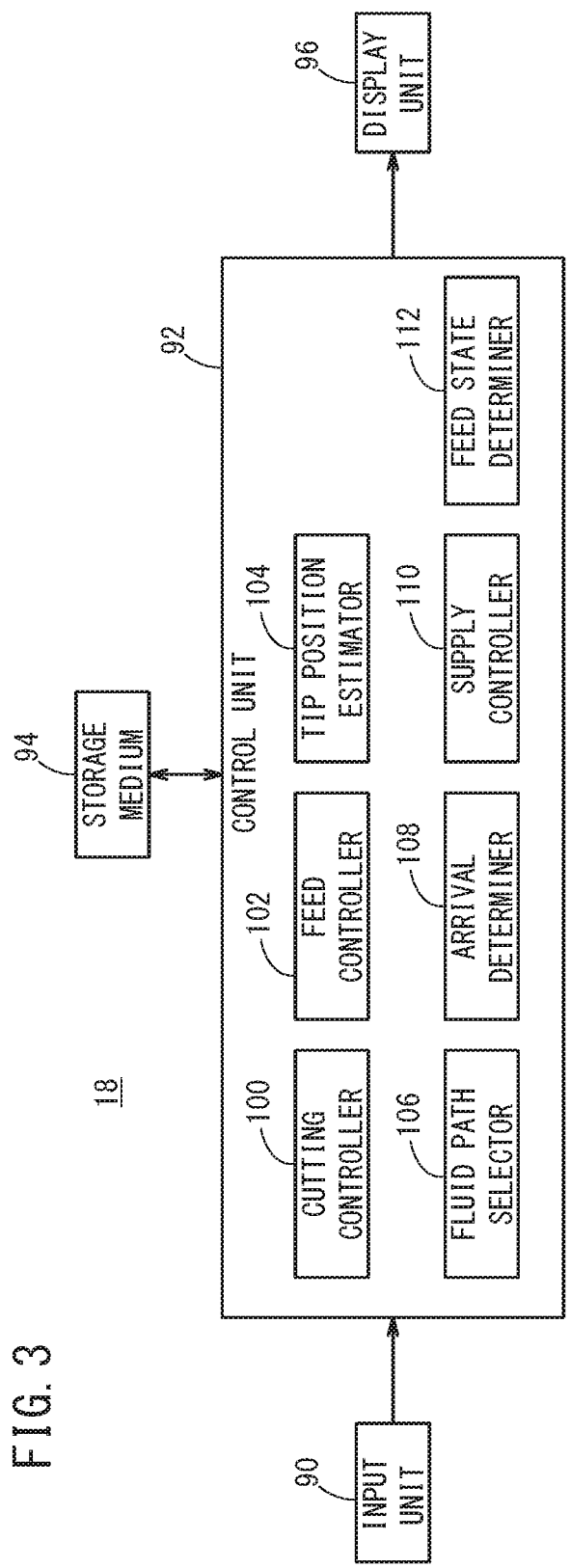
FIG. 3 is a configuration diagram of the control device.

FIG. 3 is a block diagram of the control device 18. The control device 18 includes an input unit 90, a control unit 92, a storage medium 94, and a display unit 96. The input unit 90 is an operation unit operated by an operator to enter information, instructions and the like. The input unit 90 includes a numeric keypad for inputting numerical data, various function keys (e.g., a power button), a keyboard, a touch panel, and the like.

The control unit 92 includes a processor such as a CPU, and a memory chip with a program stored therein, and the processor executes the program to provide the function of the control unit 92 of the present embodiment. The storage medium 94 stores data etc., necessary for the control unit 92 to perform control and also functions as a buffer memory.

The display unit 96 has a liquid crystal display, an organic EL display or the like, and displays necessary information and the like. The touch panel of the input unit 90 is provided over the display screen of the display unit 96. Note that the input unit 90 and the display unit 96 may be integrally formed.

The control unit 92 includes a cutting controller 100, a feed controller 102, a tip position estimator 104, a fluid path selector 106, an arrival determiner 108, a supply controller 110, and a feed state determiner 112.

The cutting controller 100 drives the aforementioned actuator to close the cutting electrode assembly 38 (each of the upper electrode 38*a* and the lower electrode 38*b*) so that the cutting electrode assembly 38 holds the wire electrode 12 (between the upper electrode 38*a* and the lower electrode 38*b*). By controlling a cutting power supply (not shown), electric current flows between the upper electrode 38*a* and the lower electrode 38*b* and heats the wire electrode 12 by Joule heat. As a result, the wire electrode 12 in the passage hole 50*a* of the upper pipe 50 is heated. The positive electrode of the cutting power supply is connected to one of the upper electrode 38*a* and the lower electrode 38*b* while the negative electrode is connected to the other electrode.

In parallel, the cutting controller 100 controls an unillustrated cooling fluid supply device to supply a cooling fluid (for example, water, gas or the like of low temperature) into the passage hole 50*a* from above the upper pipe 50 while controlling the motor M1 or M2 to pull the wire electrode 12 toward the wire bobbin 40 side (upper side).

Since the cooling fluid flows downward through the passage hole 50*a* of the upper pipe 50, the wire electrode 12 is cooled most on the upper side of the upper pipe 50 and the lower a portion of the wire electrode 12 is located in the upper pipe 50, the smaller the extent to which the portion of the wire electrode 12 is cooled becomes. Therefore, the temperature of the wire electrode 12 gradually increases from the upper side toward the lower side of the upper pipe 50, and the temperature of the wire electrode 12 near the lower electrode 38*b* is highest. In addition, since the wire electrode 12 is pulled upward, the wire electrode 12 is cut at a position near the lower electrode 38*b* where the temperature is highest. The front end of the upstream-side severed wire electrode 12 is located near the lower electrode 38*b*.

After the cutting of the wire electrode 12, the feed controller 102 controls the motors (servo motors) M1, M2, M3 to feed the wire electrode 12 at a predetermined constant speed along the wire feed path. At this time, the feed controller 102 feedback-controls the motors M1 and M2, based on the detection signals detected by the encoders EC1 and EC2 provided in the motors M1 and M2 so as to feed the wire electrode 12 at the predetermined speed. As a result, the upstream-side severed wire electrode 12 is started to be automatically wire-fed. The wire electrode 12 on the downstream side after cutting is conveyed to the downstream side by the pinch roller 58 and the feed roller 60 under the feed controller 102's control of the motor M3, and is collected into the aforementioned collecting box.

When the wire electrode 12 gets stuck on an object (for example, the upper guide block 70, the workpiece W, the inner wall of the passage holes 70*a*, 80*a*, etc.) provided along the wire feed path, the wire electrode 12 is bent. The feed controller 102, based on the detection signal (flexure signal) from the flexure detector 36, determines whether or not the wire electrode 12 has been flexed (stuck). When it is determined that the wire electrode 12 is flexed (stuck), the feed controller 102 controls the motors M1 and M2 to rewind the wire electrode 12, and again feeds the wire electrode 12 toward the pinch roller 58 and the feed roller 60. If the wire electrode 12 gets flexed (stuck) even after the wire electrode 12 is rewound and delivered a predetermined number of times, the feed controller 102 determines that auto wire feeding has failed. When determining that auto wire feeding has failed, the feed controller 102 may notify the operator of the failure by displaying the situation on the display unit 96. Here, when that auto wire feeding is determined to have failed, the cutting controller 100 cuts the wire electrode 12.

After the cutting of the wire electrode 12, the tip position estimator 104 calculates the delivery amount of the wire electrode 12, based on the detection signals detected by the encoders (delivery amount detectors) EC1, EC2 provided for the motors M1, M2, to thereby estimate (calculate) the tip position of the downstream-side severed wire electrode 12. That is, since the delivery amount of the wire electrode 12 can be known from the detection signals of the encoders EC1 and EC2, the tip position of the wire electrode 12 can be estimated from this delivery amount and the position of the lower electrode 38*b* on the feed path.

The fluid path selector 106 selects one of the multiple fluid paths FP (FP1 to FP6). The fluid path selector 106 sequentially selects a fluid path FP one at a time from the upstream side (a fluid path corresponding to a supply position SP on the upstream side). Since the multiple fluid paths FP (multiple supply positions SP) are arranged in the order of FP1 to FP6 (SP1 to SP6) from the upstream side along the wire feed path, the fluid path selector 106 selects fluid paths FP, in the order of FP1→FP2→FP3→FP4→FP5→FP6. When the feed state determiner 112 determines that the wire electrode 12 has reached the supply position SP corresponding to the fluid path FP currently selected, the fluid path selector 106 selects the adjacent fluid path FP on the downstream side. For example, when the fluid path selector 106 has currently selected the fluid path FP3 and the feed state determiner 112 determines that the wire electrode 12 has reached the supply position SP3 corresponding to the fluid path FP3, the fluid path selector 106 next selects the fluid path FP4 located on the downstream side. That is, the switching timing the fluid path selector 106 selects the fluid path FP is based on the determination result of the feed state determiner 112.

An arrival determiner 108, based on the estimation result of the tip position estimator 104, determines whether or not the tip of the wire electrode 12 has reached the supply position SP corresponding to the fluid path FP selected by the fluid path selector 106. Since the multiple fluid paths FP are selected one by one in the order of FP1 to FP6 by the fluid path selector 106, the arrival determiner 108 sequentially determines whether or not the wire electrode 12 has reached the supply position SP, in the order of SP1→SP2→SP3→SP4→SP5→SP6. More specifically, after the arrival determiner 108 confirms that the tip of the wire electrode 12 has reached the supply position SP1 of the fluid path FP1 on the wire feed path, the arrival determiner 108 determines whether or not the tip of the wire electrode 12 reaches the supply position SP2 of the fluid path FP2 on the wire feed path. The supply positions SP1 to SP6 on the wire feed path to which the compressed fluid is supplied from the fluid paths FP1 to FP6 have been known and are stored in the storage medium 94.

The supply controller 110 controls the compressed fluid supply device 16 so that the compressed fluid is supplied to one of the multiple fluid paths FP (FP1 to FP6). The supply controller 110 controls the compressed fluid supply device 16 to thereby select one fluid path FP to which the compressed fluid is supplied. Specifically, the supply controller 110 controls the compressed fluid supply device 16 so that the compressed fluid is supplied to the fluid path FP selected by the fluid path selector 106. For example, when the fluid path FP2 is selected by the fluid path selector 106, the supply controller 110 controls the compressed fluid supply device 16 so as to supply the compressed fluid to the fluid path FP2. Since the fluid path selector 106 selects a fluid path FP in the order of FP1 to FP6, the supply controller 110 controls the compressed fluid supply device 16 so that the compressed fluid is supplied to fluid paths FP in the order of FP1→FP2→FP3→FP4→FP5→FP6.

The supply controller 110 may supply the compressed fluid to the fluid path FP when the arrival determiner 108 determines that the wire electrode 12 has reached the supply position SP corresponding to the selected fluid path FP. In the present embodiment, the supply controller 110 is configured to supply the compressed fluid to the fluid path FP when the arrival determiner 108 determines that the wire electrode 12 has reached the supply position SP corresponding to the selected fluid path FP. However, the supply controller 110 may supply the compressed fluid to the fluid path currently selected before the arrival determiner 108 determines that the wire electrode 12 has reached the supply position SP corresponding to the selected fluid path FP. For example, when the fluid path FP is selected by the fluid path selector 106, the supply controller 110 may supply the compressed fluid to the selected fluid path FP.

Based on the detection result from the tension detector 34, the feed state determiner 112 determines whether or not the wire electrode 12 has reached the supply position SP corresponding to the fluid path FP to which the compressed fluid has been supplied. When a change in the tension of the wire electrode 12 is detected by the tension detector 34 (for example, when a change in tension equal to or greater than a predetermined value SV occurs), or when the detected tension of the wire electrode 12 is equal to or higher than a threshold TH, the feed state determiner 112 determines that the wire electrode 12 has been fed up to the supply position SP corresponding to the fluid path FP to which the compressed fluid has been supplied. The reason is that if the wire electrode 12 has reached the supply position SP corresponding to the currently selected fluid path FP and the compressed fluid is supplied to the supply position SP, the wire electrode 12 receives some force (e.g., a force pulling the wire electrode 12 toward the downstream side with respect to the feed direction), hence the tension of the wire electrode 12 must change.

On the other hand, if the feed state determiner 112 determines based on the detection result from the tension detector 34 that the wire electrode 12 has not yet reached the supply position SP corresponding to the fluid path FP to which the compressed fluid has been supplied, even after a predetermined time has elapsed from when the supply controller 110 stared to supply the compressed fluid, the feed state determiner 112 determines that an anomaly has occurred during the feeding of the wire electrode 12. That is, if there is no change in the tension of the wire electrode 12 or the tension does not exceed the threshold TH even though the wire electrode 12 has been delivered so that the tip of the wire would reach the supply position SP corresponding to the fluid path FP to which the compressed fluid has been supplied, a failure has occurred in the feeding of the wire electrode 12. When determining that a failure has occurred in the feeding of the wire electrode 12, the feed state determiner 112 may notify the operator of the failure by displaying the situation on the display unit 96.

Figure 4:
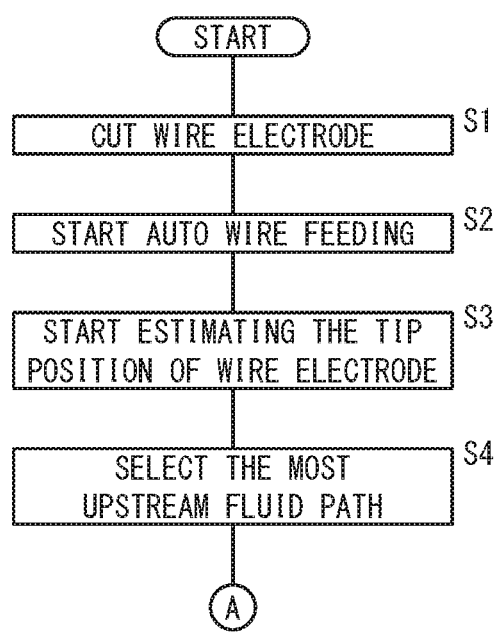
FIG. 4 is a flowchart showing the operation of the wire electrical discharge machine shown in FIG. 1; and, FIG. 5 is a flowchart showing the operation of the wire electrical discharge machine shown in FIG. 1.

Next, the operation of the wire electrical discharge machine 10 will be described with reference to the flowcharts shown in FIGS. 4 and 5. At step S1 in FIG. 4, the cutting controller 100 cuts the wire electrode 12. When auto wire feeding of the wire electrode 12 is determined to have failed, when the wire electrode 12 has broken, when the place to be machined is changed, or when the workpiece W is replaced, the cutting controller 100 cuts the wire electrode 12. At this time, the cutting position of the wire electrode 12 is near the lower electrode 38b.

Next, at step S2 the feed controller 102 starts auto wire feeding by advancing downstream the tip of the upstream-side severed wire electrode 12, located around the lower electrode 38b. At this time, the feed controller 102 may first feed the downstream-side severed wire electrode 12 toward the collection box and then feed downstream the upstream-side severed wire electrode 12. The feed controller 102 controls the motors M1, M2, and M3 to control the feeding of the wire electrode 12.

Next, at step S3, the tip position estimator 104 starts estimating the position of the tip of the wire electrode 12 based on the detection signals detected by the encoders EC1 and EC2.

Figure 5:
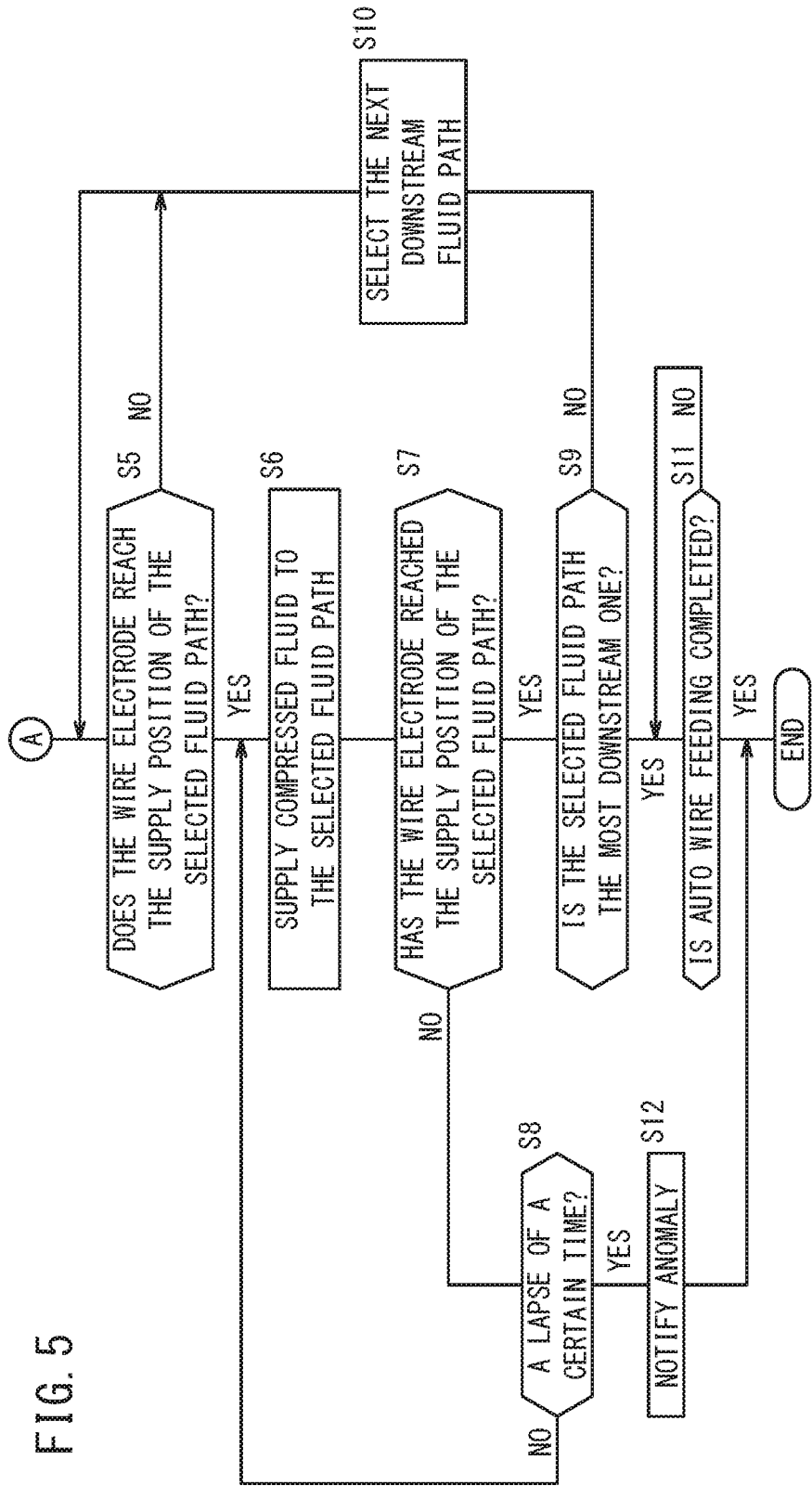

Next, at step S4, the fluid path selector 106 selects the most upstream fluid path FP, i.e., FP1, and the controls goes to step S5 in FIG. 5.

At step S5, the arrival determiner 108 determines whether or not the tip of the wire electrode 12 reaches the supply position SP (SP1) corresponding to the fluid path FP that is currently selected (FP1 at present), based on the latest tip position of the wire electrode 12 estimated by the tip position estimator 104.

At step S5, when the arrival determiner 108 determines that the tip of the wire electrode 12 has not yet reached the supply position SP (SP1) corresponding to the currently selected fluid path FP (FP1), the control stays at step S5 until arrival of the wire is confirmed. When the arrival determiner 108 determines that the tip of the wire electrode 12 has reached the supply position SP1 corresponding to the selected fluid path FP1 at step S5, the control proceeds to step S6.

At step S6, the supply controller 110 controls the compressed fluid supply device 16 to supply compressed fluid to the currently selected fluid path FP (FP1).

Next, at step S7 the feed state determiner 112 determines whether or not the wire electrode 12 reaches the supply position SP (SP1) corresponding to the currently selected fluid path FP (FP1) based on the detection result from the tension detector 34. When the tension of the wire electrode 12 has changed by the predetermined value SV or greater, or becomes equal to or higher than the threshold TH, the feed state determiner 112 determines that the wire electrode 12 has been conveyed to the supply position SP (SP1) corresponding to the currently selected fluid path FP (FP1).

At step S7, when the feed state determiner 112 determines that the wire electrode 12 has not reached the supply position SP (SP1) corresponding to the currently selected fluid path FP (FP1), the control goes to step S8.

At step S8, the feed state determiner 112 determines whether or not a predetermined time has elapsed from when the supply controller 110 started at step S6 to supply the compressed fluid to the currently selected fluid path FP (FP1). If it is determined at step S8 that the predetermined time has not elapsed, the control returns to step S6.

When the feed state determiner 112 determines at step S7 that the wire electrode 12 is fed up to the supply position SP (SP1) corresponding to the currently selected fluid path FP (FP1), the control advances to step S9.

At step S9, the fluid path selector 106 determines whether or not the currently selected fluid path FP is the most downstream fluid path FP6. Herein, since the currently selected fluid path FP (FP1) is the fluid path FP1, it is determined at step S9 that the currently selected fluid path FP1 is not the fluid path FP6, and the control goes to step S10.

At step S10, the fluid path selector 106 newly selects a fluid path FP (FP2) which is next to and is on the downstream side of the currently selected fluid path (FP1) and the control returns to step S5 to repeat the above operation. That is, at step S10 the fluid path selector 106 switches the selected fluid path FP from the fluid path FP1 to the fluid path FP2.

On the other hand, when it is determined at step S9 that the currently selected fluid path FP is the most downstream fluid path FP6, the control proceeds to step S11, where the control unit 92 determines whether or not auto wire feeding is completed. When the tension of the wire electrode 12 detected by the tension detector 34 becomes equal to or higher than a second threshold TH2, the control unit 92 determines that the auto wire feeding is completed. This is because when auto wire feeding is completed, a constant tension is applied to the wire electrode 12. This second threshold TH2 is a value greater than the threshold TH. Note that the control unit 92 may determine that auto wire feeding has been completed when a sensor provided near and on the downstream side of the pinch roller 58 and the feed roller 60 detects the wire electrode 12. At step S11, if the control unit 92 determines that auto wire feeding has not been completed, the control remains at step S11 until auto wire feeding is determined to have been completed. When it is determined that auto wire feeding has been completed, the operation ends.

When it is not determined at step S7 that the wire electrode 12 has been conveyed to the supply position SP corresponding to the currently selected fluid path FP, and when it is determined at step S8 that a predetermined time has elapsed from the start of supplying the compressed fluid to the currently selected fluid path FP, then the control goes to step S12. At step S12, the feed state determiner 112 determines that the feed state is abnormal and after the feed state determiner informs the operator of the anomaly, the operation ends. Specifically, the feed state determiner 112 displays on the display unit 96 that the feed state is abnormal. This is because if the tension of the wire electrode 12 does not vary even after a lapse of a certain time, it is considered that the wire electrode 12 has strayed away from the regular wire feed path. The anomaly may be notified by sound. In this case, it is necessary to provide a speaker in the control device 18.

When the feed state determiner 112 determines that an anomaly has occurred, the control unit 92 performs a predetermined process. The predetermined process may be, for example, a rewinding process of rewinding the wire electrode 12 by a predetermined amount or rewinding the wire electrode 12 to a predetermined position (for example, up to the lower electrode 38b), which is performed under the feed controller 102's control of the motors M1 and M2. Further, the predetermined process may be a process of cutting the wire electrode 12 by the cutting controller 100.

VARIATIONAL EXAMPLES

The above embodiment may be modified as follows.

Variational Example 1

In a variational example 1, the supply controller 110 controls the compressed fluid supply device 16 so that the flow rate or the pressure of the compressed fluid supplied to the fluid path FP changes in a predetermined pattern. When the tension of the wire electrode 12 detected by the tension detector 34 varies in the predetermined pattern, the feed state determiner 112 determines that the wire electrode 12 has reached the supply position SP on the wire feed path to which the compressed fluid is supplied from the fluid path FP. This is because it is expected that in feeding the wire electrode 12 to the supply position SP on the wire feed path corresponding to the fluid path FP, if the flow rate or the pressure of the compressed fluid supplied to the fluid path FP is changed in a predetermined pattern, the tension of the wire electrode 12 detected by the tension detector 34 also changes in the same predetermined pattern.

When the S/N ratio of the detection signal of the tension detector 34 is small, that is, when the ratio of the noise component in the detection signal of the tension detector 34 is high, the feed state determiner 112 is likely to make an erroneous determination. Use of this method makes it possible to prevent the feed state determiner 112 from making the erroneous determination. Accordingly, it is possible to accurately detect the position on the wire feed path to which the wire electrode 12 has been fed, and it is possible to correctly detect the feed state of the wire electrode 12.

Variational Example 2

In a variational example 2, the control unit 92 displays the feed state of the wire electrode 12 on the display unit 96. For example, the control unit 92 may display the determination result from the feed state determiner 112 on the display unit 96. That is, the position the wire electrode 12 has reached can be displayed on the display unit 96. However, since the feed state determiner 112 checks at each supply position SP whether the wire electrode 12 has been fed up to the supply positions SP, it is not possible to recognize between the supply positions SP how far the wire electrode 12 has been fed. Thus, between the supply positions SP, the feed state of the wire electrode 12 may be displayed based on the tip position of the wire electrode 12 estimated by the tip position estimator 104.

As described above, the wire electrical discharge machine 10 described in the above embodiment and variational examples 1 and 2 has an auto wire feeding function for automatically feeding the wire electrode 12. The wire electrical discharge machine 10 includes: a supply roller constituted by a wire bobbin 40 for supplying a wire electrode 12; collection rollers constituted by a pinch roller 58 and a feed roller 60 for collecting the wire electrode 12 supplied from the supply roller; guide parts (for example, an upper wire guide 52, a lower wire guide 54, a lower pipe 56, etc.) laid out along a wire feed path through which the wire electrode 12 is conveyed from the supply roller toward the collection rollers to guide the feeding of the wire electrode 12; a fluid path FP formed with the guide parts to supply a compressed fluid to the wire feed path so as to convey the wire electrode 12 along the wire feed path; a compressed fluid supply device 16 for supplying the compressed fluid to the fluid path FP; a tension detector 34 for detecting the tension of the wire electrode 12; and, a control device 18 controlling the compressed fluid supply device 16 so as to supply the compressed fluid to the fluid path FP and determining whether or not the wire electrode 12 has reached a supply position SP on the wire feed path to which compressed fluid has been supplied from the fluid path FP, based on the detection result of the tension detector 34. With this configuration, it is possible to determine whether or not the wire electrode has reached the supply position SP. Accordingly, it is possible to detect to which position on the wire feed path the wire electrode 12 has been fed, and detect the feed state of the wire electrode 12.

Under the condition that the compressed fluid is supplied to the fluid path FP by controlling the compressed fluid supply device 16, when the tension of the wire electrode 12 detected by the tension detector 34 changes or becomes equal to or greater than a threshold TH, the control device 18 determines that the wire electrode 12 has reached the supply position SP on the wire feed path to which the compressed fluid has been supplied through the fluid path FP. Thus, it is possible to accurately detect, with a simple structure, which position on the wire feed path the wire electrode 12 has reached.

A plurality of fluid paths FP may be formed with the guide parts so as to communicate with the wire feed path at different positions along the wire feed path, and the wire electrical discharge machine 10 may have multiple guide parts FP with fluid paths. Thus, it is possible to determine whether or not the wire electrode 12 has been fed at each of multiple points (supply positions SP) on the wire feed path of the wire electrode 12. Therefore, it is possible to finely detect to which position on the wire feed path the wire electrode 12 has been conveyed, and finely detect the feed state of the wire electrode 12.

The control device 18 controls the compressed fluid supply device 16 so that the compressed fluid is supplied from the fluid paths FP, sequentially in the order from the upstream side in the direction of feeding of the wire electrode 12. When determining that the wire electrode 12 has been fed to the supply position SP on the wire feed path to which the compressed fluid has been supplied through the fluid path FP, the control device 18 controls the compressed fluid supply device 16 so as to supply the compressed fluid to the next fluid path FP located on the downstream side. As a result, the compressed fluid is supplied from the fluid paths FP sequentially from the upstream side along the feed direction of the wire electrode 12, so that it is possible to detect which position on the wire feed path the wire electrode 12 has reached. Hence, it is possible to detect the feed state of the wire electrode 12 in a favorable manner.

The wire electrical discharge machine 10 further includes a delivery amount detector (encoders EC1, EC2) for detecting a delivery amount of the wire electrode 12. The control device 18 estimates the tip position of the wire electrode 12 on the wire feed path, based on the delivery amount detected by the delivery amount detector. When determining that the leading end of the wire electrode 12 has reached the supply position SP of the fluid path FP on the wire feed path, the control device 18 controls the compressed fluid supply device 16 so as to supply the compressed fluid to the fluid path FP corresponding to the supply point SP on the feed path at which the tip of the wire electrode 12 has reached. Then, based on the detection result from the tension detector 34, the control device 18 judges whether or not the wire electrode 12 has been fed up to the supply position SP. With this configuration, it is possible to prevent unnecessary supply of the compressed fluid and judges whether or not the wire electrode 12 is being conveyed to the estimated tip position of the wire electrode 12. Thus, it is possible to accurately detect to which position on the wire feed path the wire electrode 12 is fed, and it is possible to accurately detect the feed state of the wire electrode 12.

When the control device 18 judges based on the detection result from the tension detector 34 that the tip of the wire electrode 12 has not yet reached the expected supply position SP on the wire feed path even after a lapse of a certain time from the start of supplying the compressed fluid, the control device judges that an anomaly has occurred in the feeding of the wire electrode 12. In this way, it is possible to judge whether or not the wire electrode 12 is conveyed out of the regular wire feed path and detect the current feed state of the wire electrode 12.

In a configuration where the control device 18 controls the compressed fluid supply device 16 so that the flow rate or pressure of the compressed fluid supplied to the fluid path FP changes according to a predetermined pattern. When the tension of the wire electrode 12 detected by the tension detector 34 changes in the predetermined pattern, the control device 18 determines that the wire electrode 12 has reached the supply position SP along the wire feed path to which the compressed fluid has been supplied by the fluid path FP. Thus, this configuration makes it possible to prevent erroneous determination of the feed state of the wire electrode 12 due to noise included in the detection signal of the tension detector 34. Therefore, the position on the wire feed path to which the wire electrode 12 has been conveyed can be accurately detected, it is hence possible to accurately detect the feed state of the wire electrode 12.

The control device 18 displays the feed state of the wire electrode 12 on the display unit 96. This makes it possible for the operator to recognize the feed state of the wire electrode 12.

It is a matter of course that the present invention is not limited to the embodiments described above, and various additional or modified configurations could be adopted therein without departing from the essence and gist of the present invention.

What is claimed is:

1. A wire electrical discharge machine having an auto wire feeding function for automatically feeding a wire electrode, comprising:
    a supply roller configured to supply the wire electrode;
    a collection roller configured to collect the wire electrode supplied from the supply roller;
    a guide part, provided on a wire feed path along which the wire electrode is conveyed from the supply roller to the collection roller, and configured to guide feeding of the wire electrode;
    a fluid path formed with the guide part to supply a compressed fluid to the wire feed path so as to feed the wire electrode along the wire feed path;
    a compressed fluid supply device including a pump and configured to supply the compressed fluid to the wire feed path through the fluid path;
    a tension detector configured to detect tension of the wire electrode; and,
    a control device configured to control the compressed fluid supply device so as to supply the compressed fluid to the fluid path and determine, based on a change in the tension of the wire electrode detected by the tension detector, whether or not the wire electrode has reached a supply position on the wire feed path to which the compressed fluid has been supplied from the fluid path.

2. The wire electrical discharge machine according to claim 1, wherein the control device is configured to determine that the wire electrode has reached the supply position on the wire feed path to which the compressed fluid has been supplied through the fluid path when the tension of the wire electrode detected by the tension detector changes or is equal to or greater than a threshold.

3. The wire electrical discharge machine according to claim 1, wherein a plurality of fluid paths are formed with the guide parts so as to communicate with the wire feed path at different positions along the wire feed path.

4. The wire electrical discharge machine according to claim 1, wherein multiple guide parts formed with the fluid path are provided.

5. The wire electrical discharge machine according to claim 3, wherein:
the control device is configured to control the compressed fluid supply device so as to supply the compressed fluid from the fluid paths, sequentially in order from an upstream side in direction of feeding of the wire electrode; and,
the control device is configured to control the compressed fluid supply device so as to supply the compressed fluid to the next fluid path located on a downstream side when the control device determines that the wire electrode has reached the supply position on the wire feed path to which the compressed fluid has been supplied through the fluid path.

6. The wire electrical discharge machine according to claim 4, wherein:
the control device is configured to control the compressed fluid supply device so as to supply the compressed fluid from the fluid paths, sequentially in order from an upstream side in direction of feeding of the wire electrode; and,
the control device is configured to control the compressed fluid supply device so as to supply the compressed fluid to the next fluid path located on a downstream side when the control device determines that the wire electrode has been fed to the supply position on the wire feed path to which the compressed fluid has been supplied through the fluid path.

7. The wire electrical discharge machine according to claim 1, further comprising a delivery amount detector configured to detect a delivery amount of the wire electrode, wherein:
the control device is configured to control the compressed fluid supply device so as to supply the compressed fluid to the fluid path corresponding to the supply point on the feed path which the tip of the wire electrode is determined to have reached when the control device estimates a tip position of the wire electrode on the wire feed path based on the delivery amount detected by the delivery amount detector and determines that a tip of the wire electrode is expected to have reached the supply position of the fluid path on the wire feed path.

8. The wire electrical discharge machine according to claim 7, wherein when the control device is configured to determine that an anomaly has occurred in the feeding of the wire electrode based on the detection result from the tension detector that the tip of the wire electrode has not yet reached the expected supply position on the wire feed path even after a lapse of a certain time from start of supplying the compressed fluid.

9. The wire electrical discharge machine according to claim 1, wherein:
the control device is configured to control the compressed fluid supply device so as to supply a flow rate or pressure of the compressed fluid to the fluid path according to a predetermined pattern; and,
the control device is configured to determine that the wire electrode has reached the supply position along the wire feed path to which the compressed fluid has been supplied through the fluid path when the tension of the wire electrode detected by the tension detector changes in the predetermined pattern.

10. The wire electrical discharge machine according to claim 1, wherein the control device displays a feed state of the wire electrode on a display unit.

11. An auto wire feeding method for use in a wire electrical discharge machine having an auto wire feeding function for automatically feeding a wire electrode, wherein the wire electrical discharge machine comprises:
a supply roller configured to supply the wire electrode;
a collection roller configured to collect the wire electrode supplied from the supply roller;
a guide part, provided on a wire feed path along which the wire electrode is conveyed from the supply roller to the collection roller, and configured to guide feeding of the wire electrode; and,
a fluid path formed with the guide part to supply a compressed fluid to the wire feed path so as to feed the wire electrode along the wire feed path,
the method comprising:
a supply step of supplying the compressed fluid to the fluid path;
a tension detection step of detecting tension of the wire electrode; and,
a determination step of determining whether or not the wire electrode has reached a supply position on the wire feed path to which the compressed fluid is supplied from the fluid path, based on a change in the detected tension of the wire electrode.

12. The auto wire feeding method according to claim 11, wherein in the determination step, under a condition that the compressed fluid is supplied to the fluid path, when the tension of the wire electrode detected by the tension detector changes or is equal to or greater than a threshold, it is determined that the wire electrode has reached the supply position on the wire feed path to which the compressed fluid has been supplied through the fluid path.

13. The auto wire feeding method according to claim 11, wherein:
a plurality of fluid paths are formed with one or more of the guide parts so as to communicate with the wire feed path at different positions along the wire feed path; and,
in the supply step, the compressed fluid is supplied from the fluid paths, sequentially in order from an upstream side in direction of feeding of the wire electrode, and when determining that the wire electrode has reached the supply position on the wire feed path to which the compressed fluid has been supplied through the fluid path, the compressed fluid is supplied to the next fluid path located on a downstream side.

14. The auto wire feeding method according to claim 11, further comprising:
a delivery amount detection step of detecting a delivery amount of the wire electrode;
a position estimation step of estimating a tip position of the wire electrode on the wire feed path, based on the detected delivery amount; and,
a determination step of determining whether or not a tip of the wire electrode has reached the supply position of the fluid path on the wire feed path, wherein:
in the supply step, when the tip of the wire electrode is determined to have reached the supply position of the fluid path on the wire feed path, the compressed fluid is supplied to the fluid path corresponding to the supply point on the feed path which the tip of the wire electrode is determined to have reached.

15. The auto wire feeding method according to claim 14, wherein, when it is determined based on the detected tension of the wire electrode that the tip of the wire electrode has not yet reached the expected supply position on the wire feed path even after a lapse of a certain time from start of supplying the compressed fluid, the determination step determines that an anomaly has occurred in the feeding of the wire electrode.

16. The auto wire feeding method according to claim 11, wherein:
   in the supply step the compressed fluid is supplied to the fluid path at a flow rate or pressure according to a predetermined pattern; and,
   in the determination step, when the detected tension of the wire electrode changes in the predetermined pattern, it is determined that the wire electrode has reached the supply position along the wire feed path to which the compressed fluid has been supplied through the fluid path.

\* \* \* \* \*